United States Patent
Uozumi et al.

(10) Patent No.: US 11,609,341 B2
(45) Date of Patent: Mar. 21, 2023

(54) ELECTRONIC TIMEPIECE, SATELLITE SIGNAL RECEIVING DEVICE, AND METHOD FOR CONTROLLING SATELLITE SIGNAL RECEIVING DEVICE

(71) Applicant: Seiko Epson Corporation, Tokyo (JP)

(72) Inventors: Hiroshi Uozumi, Matsumoto (JP); Koichi Hatanaka, Matsumoto (JP)

(73) Assignee: SEIKO EPSON CORPORATION

( * ) Notice: Subject to any disclaimer, the term of this patent is extended or adjusted under 35 U.S.C. 154(b) by 460 days.

(21) Appl. No.: 16/750,104

(22) Filed: Jan. 23, 2020

(65) Prior Publication Data

US 2020/0241481 A1 Jul. 30, 2020

(30) Foreign Application Priority Data

Jan. 24, 2019 (JP) .............................. JP2019-010240

(51) Int. Cl.
*G01S 19/34* (2010.01)
*G04R 20/04* (2013.01)
*G04G 19/06* (2006.01)

(52) U.S. Cl.
CPC .............. *G01S 19/34* (2013.01); *G04G 19/06* (2013.01); *G04R 20/04* (2013.01)

(58) Field of Classification Search
CPC .......... G01S 19/34; G04G 19/06; G04R 20/04
See application file for complete search history.

(56) References Cited

U.S. PATENT DOCUMENTS

| | | | | |
|---|---|---|---|---|
| 7,079,076 B2* | 7/2006 | Montheard | ............. | G01S 19/28 342/357.67 |
| 7,974,155 B2* | 7/2011 | Matsuzaki | ............. | G04R 20/04 342/357.69 |
| 8,164,519 B1* | 4/2012 | Bedoya Martinez | ... | G01S 19/34 342/357.69 |
| 8,731,110 B1* | 5/2014 | Zhou | ....................... | G01S 19/34 375/150 |
| 2009/0315763 A1 | 12/2009 | Matsuzaki | | |

FOREIGN PATENT DOCUMENTS

| | | |
|---|---|---|
| JP | 2007-271544 A | 10/2007 |
| JP | 2009-036749 A | 2/2009 |
| JP | 2011-179856 A | 9/2011 |
| JP | 2012-021774 A | 2/2012 |

* cited by examiner

*Primary Examiner* — Cassi J Galt
(74) *Attorney, Agent, or Firm* — Harness, Dickey & Pierce, P.L.C.

(57) ABSTRACT

An electronic timepiece includes: a power source; a correlation computation unit executing correlation computation processing of sequentially computing a correlation value between a signal sample and a plurality of codes corresponding to a plurality of satellites; a power source voltage determination unit to which a voltage of a power source is inputted and which determines whether the inputted voltage is lower than a first threshold or not, or whether the voltage exceeds a second threshold set to be equal to or higher than the first threshold; and a correlation computation control unit controlling the correlation computation unit to interrupt the correlation computation processing when the power source voltage determination unit determines that the voltage is lower than the first threshold, and to resume the correlation computation processing when the power source voltage determination unit determines that the voltage exceeds the second threshold.

8 Claims, 6 Drawing Sheets

ELECTRONIC TIMEPIECE, SATELLITE SIGNAL RECEIVING DEVICE, AND METHOD FOR CONTROLLING SATELLITE SIGNAL RECEIVING DEVICE

The present application is based on, and claims priority from, JP Application Serial Number 2019-010240, filed Jan. 24, 2019, the disclosure of which is hereby incorporated by reference herein in its entirety.

BACKGROUND

1. Technical Field

The present disclosure relates to an electronic timepiece, a satellite signal receiving device, and a method for controlling a satellite signal receiving device.

2. Related Art

JP-A-2007-271544 discloses a GPS receiving device which receives a GPS signal transmitted from a GPS satellite and thus acquires navigation data. The GPS receiving device of JP-A-2007-271544 decides the number of reception channels to operate according to the remaining capacity of the battery and therefore can receive a GPS signal even when the remaining capacity of the battery is low.

However, in JP-A-2007-271544, the remaining capacity of the battery is detected only before receiving a GPS signal. This poses a problem in that the system of the GPS receiving device may go down when the remaining capacity of the battery drops due to an unexpected factor such as an operation of the device in response to a user operation during GPS signal reception processing.

SUMMARY

An electronic timepiece according to an aspect of the present disclosure includes: a power source; a receiving unit receiving at least one of satellite signals transmitted from a plurality of satellites, converting the satellite signal into a digital signal, and outputting the digital signal; a signal sample storage unit storing the digital signal as a signal sample; a correlation computation unit executing correlation computation processing of sequentially computing a correlation value between the signal sample and a plurality of codes corresponding to the plurality of satellites; a correlation computation result storage unit storing a result of correlation computation by the correlation computation unit; a power source power supply unit supplying electric power from the power source to the receiving unit, the signal sample storage unit, the correlation computation unit, and the correlation computation result storage unit; a power source voltage determination unit detecting a voltage of the power source and determining whether the detected voltage is lower than a first threshold or not, or whether the voltage exceeds a second threshold set to be equal to or higher than the first threshold; and a correlation computation control unit controlling the correlation computation unit to interrupt the correlation computation processing when the power source voltage determination unit determines that the voltage is lower than the first threshold, and to resume the correlation computation processing when the power source voltage determination unit determines that the voltage exceeds the second threshold.

In the electronic timepiece according to the aspect of the present disclosure, the power source voltage determination unit may output an interrupt signal to interrupt the correlation computation processing to the correlation computation control unit when determining that the voltage is lower than the first threshold. The power source voltage determination unit may stop outputting the interrupt signal when determining that the voltage exceeds the second threshold. The correlation computation control unit, when the interrupt signal is inputted thereto, may control the correlation computation unit to interrupt the correlation computation processing and cause the correlation computation result storage unit to store the result of correlation computation, at a point when computation of a correlation value between a code and the signal sample computed at a point when the interrupt signal is inputted is ended. The correlation computation control unit, when the input of the interrupt signal is stopped, may control the correlation computation unit to resume the correlation computation processing, based on the result of correlation computation stored in the correlation computation result storage unit.

In the electronic timepiece according to the aspect of the present disclosure, the correlation computation control unit may control the power source power supply unit to stop the supply of electric power to the correlation computation unit and thus interrupt the correlation computation processing, when the power source voltage determination unit determines that the voltage is lower than the first threshold. The correlation computation control unit may control the power source power supply unit to resume the supply of electric power to the correlation computation unit and thus resume the correlation computation processing, when the power source voltage determination unit determines that the voltage exceeds the second threshold.

In the electronic timepiece according to the aspect of the present disclosure, the correlation computation unit may have a plurality of correlators. The correlation computation control unit may decide a number of the correlators used, according to the voltage.

A satellite signal receiving device according to an aspect of the present disclosure includes: a receiving unit receiving at least one of satellite signals transmitted from a plurality of satellites, converting the satellite signal into a digital signal, and outputting the digital signal; a signal sample storage unit storing the digital signal as a signal sample; a correlation computation unit executing correlation computation processing of sequentially computing a correlation value between the signal sample and a plurality of codes corresponding to the plurality of satellites; a correlation computation result storage unit storing a result of correlation computation by the correlation computation unit; a power source power supply unit supplying electric power from a power source to the receiving unit, the signal sample storage unit, the correlation computation unit, and the correlation computation result storage unit; a power source voltage determination unit detecting a voltage of the power source and determining whether the detected voltage is lower than a first threshold or not, or whether the voltage exceeds a second threshold set to be equal to or higher than the first threshold; and a correlation computation control unit controlling the correlation computation unit to interrupt the correlation computation processing when the power source voltage determination unit determines that the voltage is lower than the first threshold, and to resume the correlation computation processing when the power source voltage determination unit determines that the voltage exceeds the second threshold.

In the satellite signal receiving device according to the aspect of the present disclosure, the power source voltage determination unit may output an interrupt signal to interrupt the correlation computation processing to the correlation computation control unit when determining that the voltage is lower than the first threshold. The power source voltage determination unit may stop outputting the interrupt signal when determining that the voltage exceeds the second threshold. The correlation computation control unit, when the interrupt signal is inputted thereto, may control the correlation computation unit to interrupt the correlation computation processing and cause the correlation computation result storage unit to store the result of correlation computation, at a point when computation of a correlation value between a code and the signal sample computed at a point when the interrupt signal is inputted is ended. The correlation computation control unit, when the input of the interrupt signal is stopped, may control the correlation computation unit to resume the correlation computation processing, based on the result of correlation computation stored in the correlation computation result storage unit.

A method for controlling a satellite signal receiving device according to an aspect of the present disclosure is a method for controlling a satellite signal receiving device including: a receiving unit receiving at least one of satellite signals transmitted from a plurality of satellites, converting the satellite signal into a digital signal, and outputting the digital signal; a signal sample storage unit storing the digital signal as a signal sample; a correlation computation unit executing correlation computation processing of sequentially computing a correlation value between the signal sample and a plurality of codes corresponding to the plurality of satellites; a correlation computation result storage unit storing a result of correlation computation by the correlation computation unit; a power source power supply unit supplying electric power from a power source to the receiving unit, the signal sample storage unit, the correlation computation unit, and the correlation computation result storage unit; and a power source voltage determination unit detecting a voltage of the power source and determining whether the detected voltage is lower than a first threshold or not, or whether the voltage exceeds a second threshold set to be equal to or higher than the first threshold. The method includes: interrupting the correlation computation processing by the correlation computation unit when the power source voltage determination unit determines that the voltage is lower than the first threshold; and resuming the correlation computation processing by the correlation computation unit when the power source voltage determination unit determines that the voltage exceeds the second threshold.

The method for controlling a satellite signal receiving device according to the aspect of the present disclosure may further include: outputting an interrupt signal to interrupt the correlation computation processing when the power source voltage determination unit determines that the voltage is lower than the first threshold; when the interrupt signal is inputted thereto, controlling the correlation computation unit to interrupt the correlation computation processing and causing the correlation computation result storage unit to store the result of correlation computation, at a point when computation of a correlation value between a code and the signal sample computed at a point when the interrupt signal is inputted is ended; stopping outputting the interrupt signal when the power source voltage determination unit determines that the voltage exceeds the second threshold; and when the input of the interrupt signal is stopped, controlling the correlation computation unit to resume the correlation computation processing, based on the result of correlation computation stored in the correlation computation result storage unit.

DESCRIPTION OF EXEMPLARY EMBODIMENTS

First Embodiment

An electronic timepiece 1 according to a first embodiment of the present disclosure will now be described with reference to the drawings.

Figure 1:
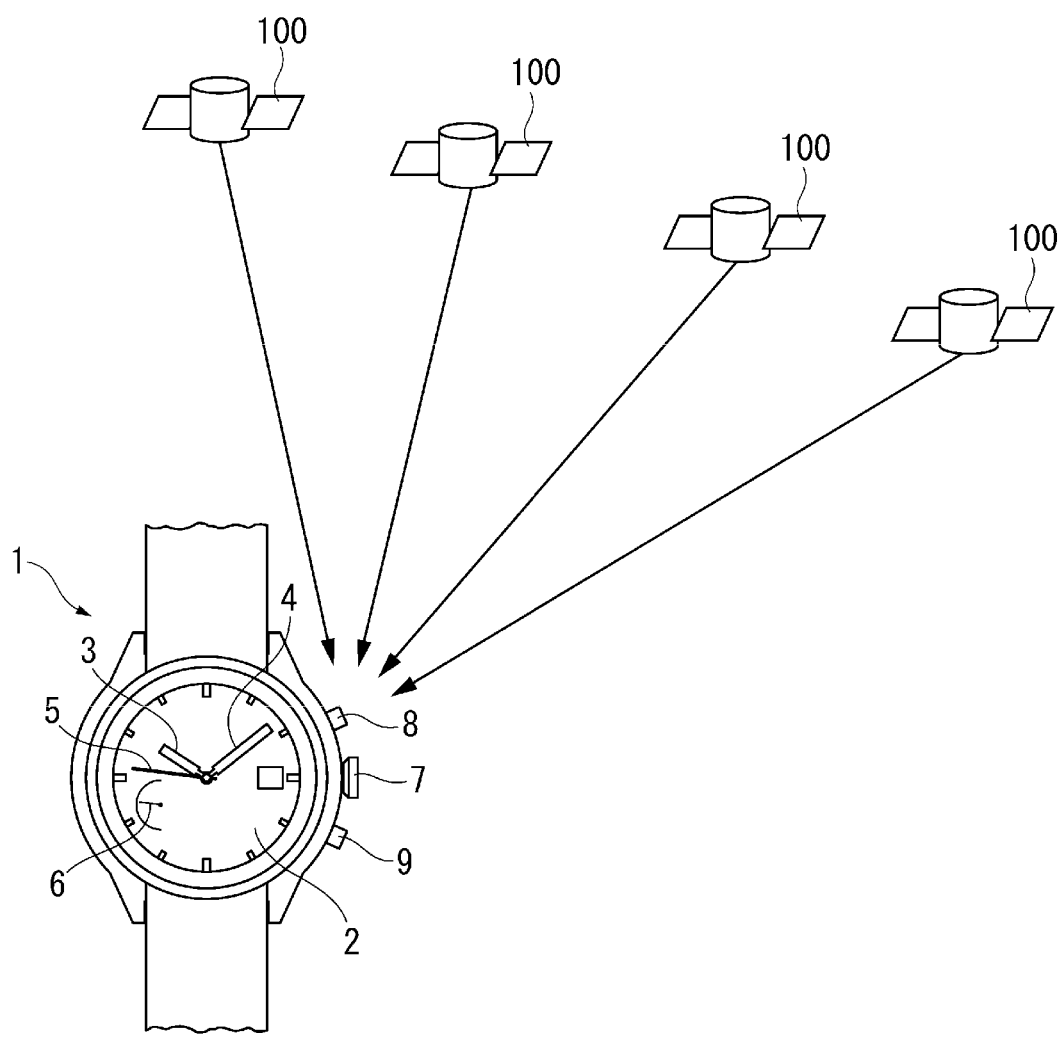
FIG. 1 is a schematic view showing an electronic timepiece according to a first embodiment.

FIG. 1 is a schematic view showing the electronic timepiece 1 in this embodiment.

The electronic timepiece 1 is configured to receive at least one of satellite signals from a plurality of location information satellites 100 circling the earth along a predetermined orbit in space and thus acquire time information. The electronic timepiece 1 is also configured to receive at least three of satellite signals transmitted from the location information satellites 100 and thus calculate and acquire location information.

The location information satellite 100 is a location information satellite used in the GNSS such as a GPS satellite. A plurality of such location information satellites exist in space around the earth. For example, currently about 30 GPS satellites exist in space around the earth. The GNSS is an abbreviation of Global Navigation Satellite System.

The location information satellite 100 is not limited to the above and includes a geosynchronous satellite in a satellite-based augmentation system or the like, and a satellite in a regional navigation satellite system that can search only a specified region such as a quasi-zenith satellite.

As shown in FIG. 1, the electronic timepiece 1 has a dial 2, hands 3 to 6, a crown 7, an A button 8, and a B button 9.

The hand 3 is an hour hand. The hand 4 is a minute hand. The hand 5 is a second hand. The hand 6 is a mode hand indicating various kinds of information.

Configuration of Electronic Timepiece

Figure 2:
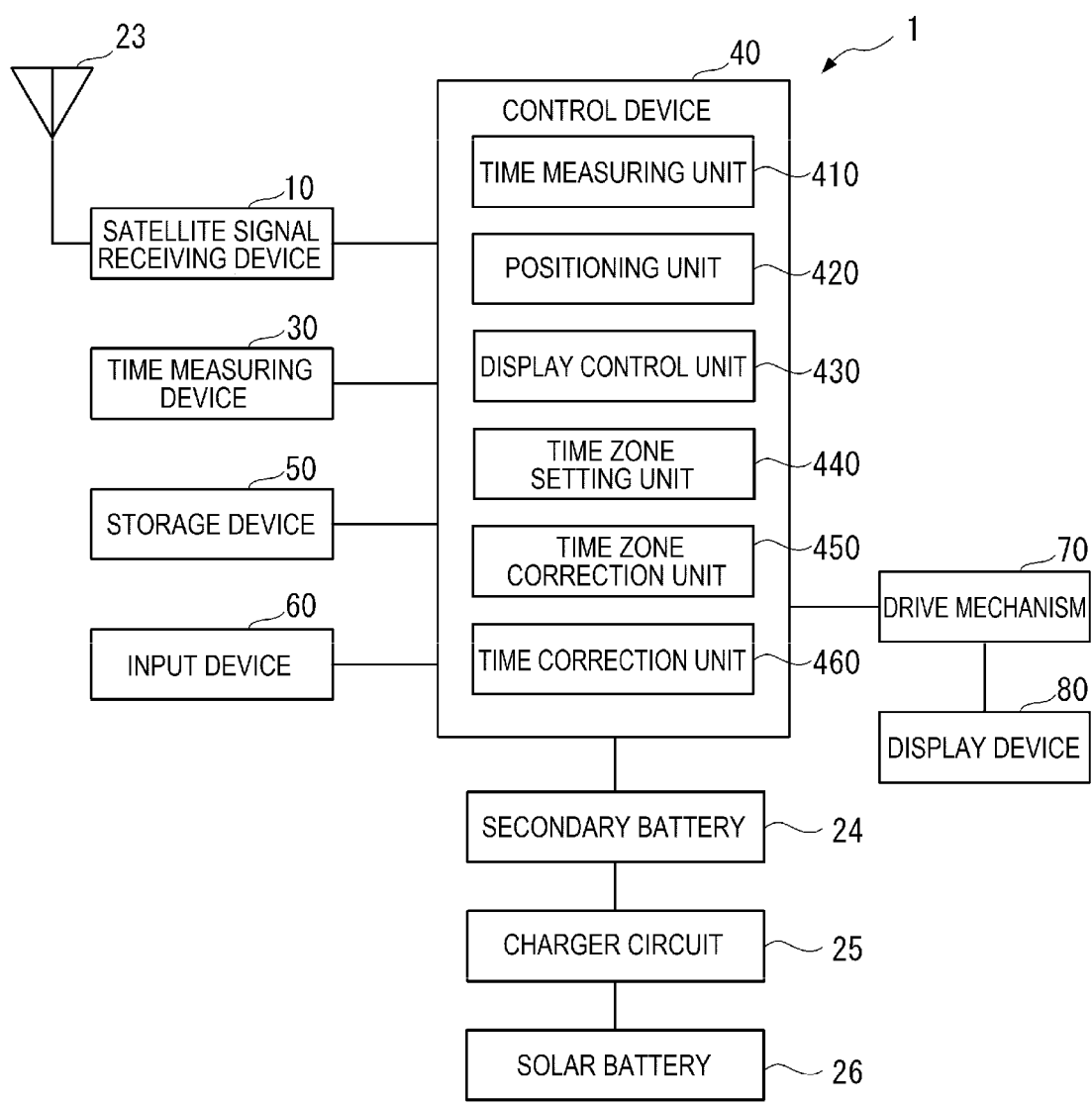
FIG. 2 is a block diagram showing a schematic configuration of the electronic timepiece in the first embodiment.

FIG. 2 is a block diagram showing a schematic configuration of the electronic timepiece 1.

As shown in FIG. 2, the electronic timepiece 1 has a satellite signal receiving device 10, an antenna unit 23, a secondary battery 24, a charger circuit 25, a solar battery 26, a time measuring device 30, a control device 40, a storage device 50, an input device 60, a drive mechanism 70, and a display device 80. These devices transmit and receive data via a data bus, not illustrated.

The input device 60 includes the crown 7, the A button 8, and the B button 9 shown in FIG. 1.

The charger circuit 25 supplies electric power generated by the solar battery 26 to the secondary battery 24 and thus charges the secondary battery 24.

The secondary battery 24 is a coin-type lithium secondary battery with a nominal voltage of 3.7 V and is an example of the power source in this disclosure. However, the secondary battery 24 is not limited to the above configuration and may be, for example, a coin-type lithium secondary battery with a nominal voltage of 2.4 V or a coin-type lithium secondary battery with a nominal voltage of 1.5 V.

The drive mechanism 70 includes a stepper motor, not illustrated, driving the hands 3 to 6 shown in FIG. 1, a gear train, and a drive circuit or the like. The drive mechanism 70 drives the hands 3 to 6 via the stepper motor, the gear train and the like.

The antenna unit 23 is an antenna receiving a satellite signal transmitted from the location information satellite 100. In this embodiment, the antenna unit 23 is formed of a patch antenna. However, the antenna unit 23 is not limited to being formed of a patch antenna and may be formed of, for example, a dipole antenna, inverted-F antenna, ring antenna or the like.

The display device 80 has the dial 2 and the hands 3 to 6 shown in FIG. 1. However, the display device 80 is not limited to the above configuration and may have, for example, a time display unit formed of a liquid crystal panel or the like.

Satellite Signal Receiving Device

The satellite signal receiving device 10, when driven by the control device 40, receives a radio wave of a satellite signal transmitted from the location information satellite 100 via the antenna unit 23. When successful in receiving the radio wave of the satellite signal, the satellite signal receiving device 10 transmits the acquired information such as orbit information and time information to the control device 40. Meanwhile, when unsuccessful in receiving the satellite signal, the satellite signal receiving device 10 transmits information to that effect to the control device 40. Details of the satellite signal receiving device 10 will be described later.

The time measuring device 30 has a quartz crystal oscillator driven by electric power accumulated in the secondary battery 24 and measures internal time, using a reference signal based on an oscillation signal of the quartz crystal oscillator.

The control device 40 is formed of a CPU controlling the electronic timepiece 1. The control device 40 has a time measuring unit 410, a positioning unit 420, a display control unit 430, a time zone setting unit 440, a time zone correction unit 450, and a time correction unit 460.

Figure 3:
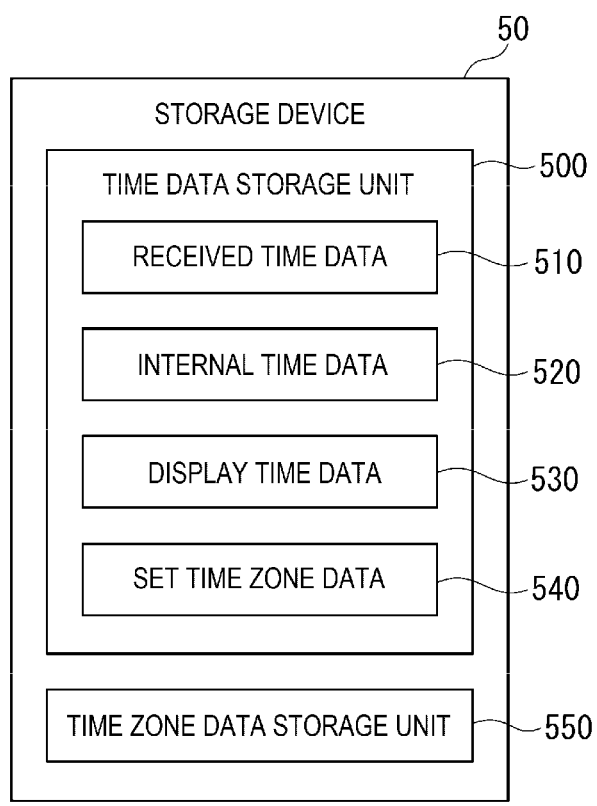
FIG. 3 is a block diagram showing a schematic configuration of a storage device in the first embodiment.

FIG. 3 is a block diagram showing a schematic configuration of the storage device 50.

The storage device 50 is formed of a RAM, ROM or the like and has a time data storage unit 500 and a time zone data storage unit 550, as shown in FIG. 3.

In the time data storage unit 500, received time data 510, internal time data 520, display time data 530, and set time zone data 540 are stored.

Back to FIG. 2, the configuration of the control device 40 will now be described.

The time measuring unit 410 actuates the satellite signal receiving device 10, thus captures at least one location information satellite 100, receives a satellite signal transmitted from the location information satellite 100, and acquires time information. In this embodiment, the time measuring unit 410 is configured to be able to execute reception processing by automatic reception processing and by manual reception processing. The automatic reception processing may be, for example, fixed-time automatic reception processing in which reception processing is executed when a fixed reception time has come, or light-induced automatic reception processing in which reception processing is executed when it can be determined that sunlight is cast on the solar battery 26 outdoors, or the like.

The positioning unit 420 actuates the satellite signal receiving device 10, thus captures at least three, preferably four or more location information satellites 100, receives a satellite signal transmitted from each location information satellite 100, and calculates and acquires location information. The positioning unit 420 can simultaneously acquire time information when receiving the satellite signal. In this embodiment, the positioning unit 420 is configured to be able to execute reception processing by automatic reception processing and by manual reception processing, similarly to the time measuring unit 410.

The display control unit 430 controls the drive mechanism 70 to cause the hands 3 to 6 to show time and various kinds of information.

The display control unit 430 may be configured to be able to control the drive mechanism 70, for example, according to the voltage of the secondary battery 24. That is, the display control unit 430 may be configured to control the drive mechanism 70 to stop driving the hands 3 to 6 when the voltage of the secondary battery 24 is lower than a predetermined threshold. Thus, when the voltage of the secondary battery 24 drops, restraining power consumption can prevent the system from going down.

In this case, the measurement of internal time by the time measuring device 30 is continued. Thus, for example, when the voltage of the secondary battery 24 becomes equal to or higher than a predetermined threshold as it is charged via the solar battery 26, the display control unit 430 can control the drive mechanism 70 to cause the hands 3 to 5 to show time information.

When the positioning unit 420 is successful in acquiring location information, the time zone setting unit 440 sets time zone data acquired from the time zone data storage unit 550, as the set time zone data 540, based on acquired latitude information and longitude information.

When either time difference information or city information is selected by an operation on the input device 60, the time zone setting unit 440 sets time zone data corresponding to the selected time difference information or city information, as the set time zone data 540.

As the time zone setting unit 440 sets the time zone data, the time zone correction unit 450 corrects the display time data 530, using the set time zone data 540. Therefore, the display time data 530 is the internal time data 520 plus the set time zone data 540.

When the time measuring unit 410 or the positioning unit 420 is successful in acquiring time information in the reception processing, the time correction unit 460 corrects the received time data 510 by the acquired time information. Therefore, the internal time data 520 and the display time data 530 are corrected as well. As the display time data 530 is corrected, the time indicated by the hands 3 to 5 synchronized with the display time data 530 is corrected as well.

The configuration of the storage device 50 shown in FIG. 3 will now be described.

As the received time data 510, time information received by the satellite signal receiving device 10 is stored. The received time data 510 is normally updated every second by the time measuring device 30. When time information is received, the received time information is stored as the received time data 510.

Internal Time Data

As the internal time data 520, internal time, which is the time information stored as the received time data 510 plus a leap second, is stored. That is, UTC is stored as the internal time data 520. When the received time data 510 is updated by the time measuring device 30, the internal time is updated as well.

As the display time data 530, time data, which is the internal time of the internal time data 520 plus the time zone data of the set time zone data 540, is stored.

As the set time zone data 540, the time zone data, that is, the time difference information, is set by the time zone setting unit 440. Specifically, the time zone setting unit 440 selects and acquires the time zone data, that is, the time difference information corresponding to the location information, from the time zone data storage unit 550, and stores this time difference information as the set time zone data 540.

For example, Japan Standard Time is nine hours ahead of UTC. Therefore, when the location information acquired by the positioning unit 420 represents Japan, the time zone setting unit 440 reads out the time difference information of Japan Standard Time from the time zone data storage unit 550 and sets this time difference information as the set time zone data 540.

The time zone data storage unit 550 stores latitude information, longitude information, and time zone data in association with each other. Therefore, when location information is acquired in a positioning mode, the control device 40 can acquire time zone data based on the location information.

Configuration of Satellite Signal Receiving Device

Figure 4:
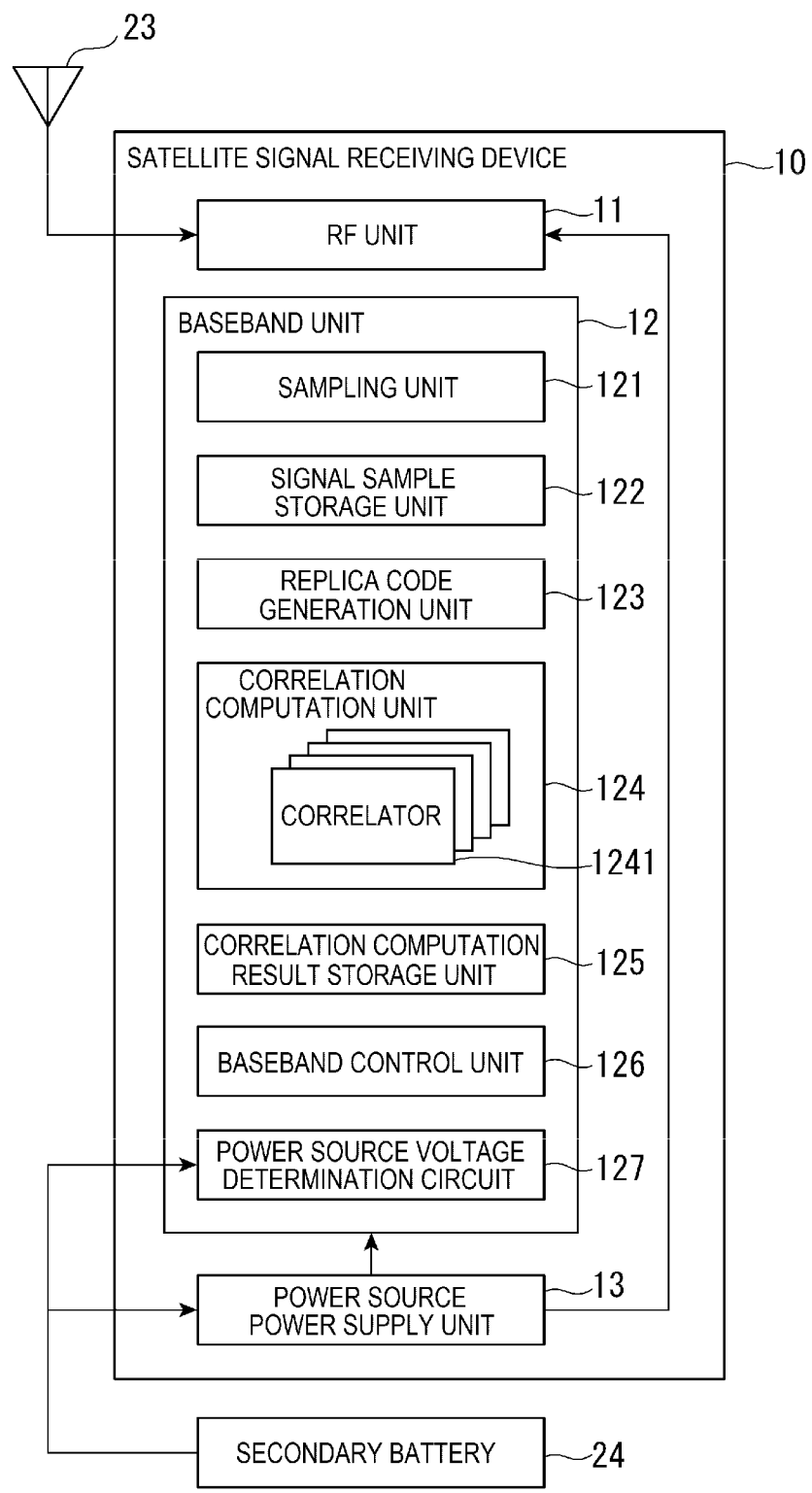
FIG. 4 is a block diagram showing a schematic configuration of a satellite signal receiving device in the first embodiment.

FIG. 4 is a block diagram showing a schematic configuration of the satellite signal receiving device 10.

As shown in FIG. 4, the satellite signal receiving device 10 has an RF unit 11, a baseband unit 12, and a power source power supply unit 13.

The power source power supply unit 13 supplies electric power from the secondary battery 24 to the RF unit 11 and the baseband unit 12.

RF Unit

The RF unit 11 receives a radio wave in the frequency band of a satellite signal, using the antenna unit 23, and outputs a signal sample. Specifically, the RF unit 11 has a processing unit or the like that receives and processes a satellite signal, including an amplifier circuit amplifying the signal sample, a band-pass filter eliminating a signal component outside the frequency band of the satellite signal from the signal sample, and a mixer circuit mixing a local oscillator signal and thus converting a received signal into a signal in an intermediate frequency band.

The RF unit 11 is provided with a processing unit for every GNSS from which the RF unit 11 can receive a signal. The RF unit 11 operates the processing unit corresponding to the GNSS from which the RF unit 11 receives a signal. For example, when the RF unit 11 can receive a signal from four types of systems, GPS, Galileo, GLONASS, and Beidou, the RF unit 11 has processing units of the corresponding four types and operates the processing unit corresponding to the GNSS from which the RF unit 11 receives a signal. The type of the GNSS from which a signal is received may be selected by a user. Alternatively, the GNSS from which information is successfully acquired in the previous reception may be set preferentially.

Baseband Unit

The baseband unit 12 has a sampling unit 121, a signal sample storage unit 122, a replica code generation unit 123, a correlation computation unit 124, a correlation computation result storage unit 125, a baseband control unit 126, and a power source voltage determination circuit 127.

The sampling unit 121 has an analog-to-digital converter or the like. The sampling unit 121 converts the signal sample outputted from the RF unit 11 into a digital signal with a predetermined sampling period and outputs the digital signal. That is, in this embodiment, the RF unit 11 and the sampling unit 121 together form the receiving unit according to the present disclosure.

In the signal sample storage unit 122, the digital signal outputted from the sampling unit 121 is stored as a signal sample. In the signal sample storage unit 122, a dedicated area for each type of GNSS may be secured. Also, the signal sample storage unit 122 may be shared among a plurality of types of GNSS. The signal sample storage unit 122 may be configured to be able to change the size of the signal sample that can be accumulated. The signal sample storage unit 122 is configured to be able to set at least a size that can support the GNSS from which a signal is received.

The replica code generation unit 123 generates a replica code of a PRN code corresponding to the type of GNSS designated by the baseband control unit 126 and the location information satellite 100 as a reception target. The replica code is an example of the code corresponding to the satellite according to the present disclosure.

The correlation computation unit 124 executes correlation computation processing of computing a correlation value between the signal sample stored in the signal sample storage unit 122 and the replica code generated by the replica code generation unit 123. In this embodiment, the correlation computation unit 124 has a plurality of correlators 1241 executing correlation computation processing. In this embodiment, the correlation computation unit 124 has M correlators 1241.

The correlation computation result storage unit 125 stores a result of correlation computation from the correlation computation processing by the correlation computation unit 124.

The baseband control unit 126 controls the RF unit 11, the sampling unit 121, the signal sample storage unit 122, the replica code generation unit 123, and the correlation computation unit 124, based on a command from the control device 40, and thus captures the location information satellite 100. The baseband control unit 126 then generates a measurement including a code phase and frequency of the captured location information satellite 100, from this location information satellite 100, and outputs the generated measurement to the control device 40. The baseband control unit 126 is an example of the correlation computation control unit according to the present disclosure.

The power source voltage determination circuit 127 detects a voltage V of the secondary battery 24 at a predetermined interval. The power source voltage determination circuit 127 then compares the detected voltage V with a predetermined threshold and determines the voltage V. Specifically, the power source voltage determination circuit 127 is formed of a circuit, and detects the voltage V of the secondary battery 24 at an interval of 0.1 msec or shorter, compares the detected voltage V with a predetermined threshold, and determines the voltage V. The power source voltage determination circuit 127 then outputs a signal based on the result of the determination to the baseband control unit 126. The power source voltage determination circuit 127 is an example of the power source voltage determination unit according to the present disclosure.

In this embodiment, the power source voltage determination circuit 127 is provided as a circuit within the satellite signal receiving device 10. Therefore, the time taken to input a signal to the baseband control unit 126 after determining the voltage V is shorter than, for example, when the control device 40 detects and determines the voltage V and inputs a signal based on the result of the determination to the baseband control unit 126.

Satellite Capture Control Processing

A method for controlling satellite capture control processing by the satellite signal receiving device 10 will now be described with reference to the flowchart of FIG. 5. In this embodiment, processing of capturing N location information satellites 100 is described.

In the satellite capture control processing as step S100, the baseband control unit 126 sequentially executes capture processing of the first to N-th location information satellites 100.

Figure 5:
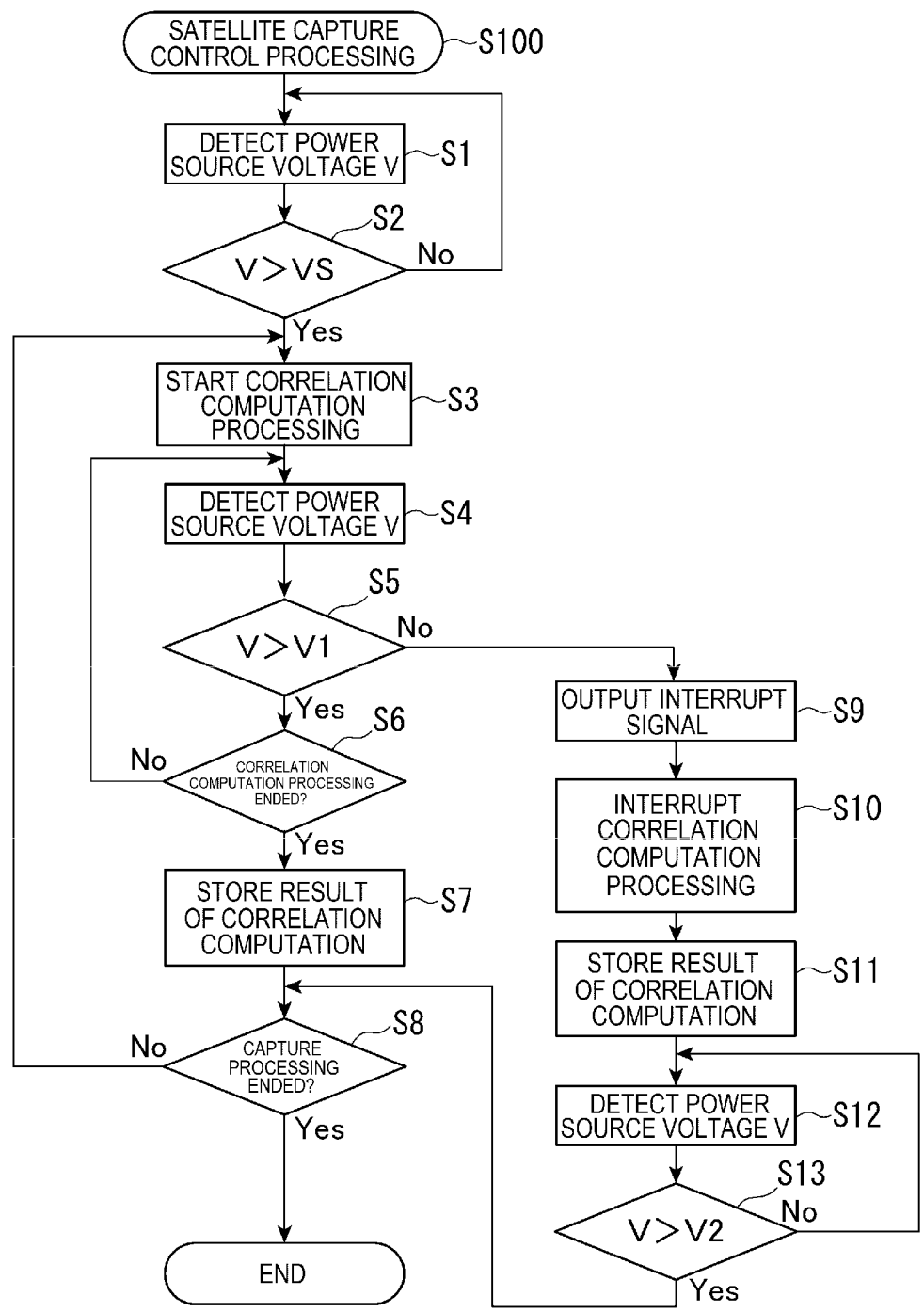
FIG. 5 is a flowchart showing satellite capture control processing in the first embodiment.

As shown in FIG. 5, as the satellite capture control processing is executed, the power source voltage determination circuit 127 detects the voltage V of the secondary battery 24 in step S1.

In step S2, the baseband control unit 126 determines whether the voltage V of the secondary battery 24 is higher than a preset threshold VS or not. As the threshold VS, a value high enough to enable the correlation computation unit 124 to execute the correlation computation processing is set. For example, a value of approximately 2.6 V is set. This can restrain the system of the electronic timepiece 1 from going down immediately after the correlation computation processing starts.

When the result of the determination in step S2 is No, the processing returns to step S1 and the same processing is repeated.

Meanwhile, when the result of the determination in step S2 is Yes, the baseband control unit 126 in step S3 has a signal based on the result of the determination inputted from the power source voltage determination circuit 127, controls the RF unit 11, the sampling unit 121, the signal sample storage unit 122, the replica code generation unit 123, and the correlation computation unit 124, and thus sequentially starts the correlation computation processing for the first to N-th location information satellites 100.

Specifically, the baseband control unit 126 controls the RF unit 11, the sampling unit 121, and the signal sample storage unit 122 to receive a radio wave, and causes the signal sample storage unit 122 to store a digital signal converted into digital data by the sampling unit 121, as a signal sample. Next, the baseband control unit 126 controls the replica code generation unit 123 to sequentially generate a replica code corresponding to the location information satellite 100. The baseband control unit 126 then controls the correlation computation unit 124 to sequentially starts computing a correlation value between the signal sample stored in the signal sample storage unit 122 and the replica code.

The frequency of the satellite signal transmitted from the location information satellite 100 changes due to the Doppler effect. Therefore, the baseband control unit 126 may be configured to execute the correlation computation processing while sequentially changing the frequency of a replica code in a certain phase. For example, the baseband control unit 126 may be configured to change the frequency with a preset resolution in such a way as to execute the correlation computation processing by setting a replica code corresponding to one location information satellite 100, and then execute the computation of the correlation value between the replica code and the signal sample. Thus, the Doppler effect can be eliminated.

Next, in step S4, the power source voltage determination circuit 127 detects the voltage V of the secondary battery 24.

Then, in step S5, the power source voltage determination circuit 127 determines whether the voltage V of the secondary battery 24 is higher than a preset threshold V1 or not.

As the threshold V1, a value close to a system halt voltage that is set in such a way as to prevent the system of the electronic timepiece 1 from going down. For example, a value of approximately 2.4 V is set. The threshold V1 is an example of the first threshold according to the present disclosure.

When the result of the determination in step S5 is Yes, the baseband control unit 126 in step S6 has a signal based on the result of determination inputted from the power source voltage determination circuit 127 and determines whether the currently executed correlation computation processing for the location information satellite 100 has ended or not. When the correlation computation processing is executed changing the frequency of a replica code in a certain phase, the baseband control unit 126 determines whether the computation of the correlation value between the replica code of the currently set frequency and the signal sample has ended or not.

When the result of the determination in step S6 is No, the processing returns to step S4 and the currently executed correction computation processing for the location information satellite 100 is continued.

When the result of the determination in step S6 is Yes, the baseband control unit 126 in step S7 causes the correlation computation result storage unit 125 to store the result of correlation computation from the currently executed correlation computation processing for the location information satellite 100. When the correlation computation processing is executed changing the frequency of a replica code in a certain phase, the baseband control unit 126 causes the correlation computation result storage unit 125 to store the result of correlation computation in association with a set phase and frequency.

Then, in step S8, the baseband control unit 126 determines whether the capture processing has ended or not, that is, whether the correlation computation processing for the N-th location information satellite 100 has ended or not.

When the result of the determination in step S8 is No, the processing returns to step S3. That is, the correlation computation processing for the next location information satellite 100 is started. Thus, the baseband control unit 126 sequentially executes the correlation computation processing for the first to N-th location information satellites 100. When the correlation computation processing is executed changing the frequency of the replica code, the correlation computation processing between the replica code of the next frequency and the signal sample is started.

When the result of the determination in step S8 is Yes, the baseband control unit 126 ends the satellite capture control processing.

Back to step S5, when the result of the determination in step S5 is No, the power source voltage determination circuit 127 in step S9 outputs an interrupt signal to the baseband control unit 126.

When the interrupt signal is inputted to the baseband control unit 126, the baseband control unit 126 in step S10 controls the correlation computation unit 124 to interrupt the correlation computation processing. In this case, the baseband control unit 126 controls the correlation computation unit 124 to interrupt the correlation computation processing at the point when the computation of the correlation value between the replica code and the signal sample that is computed at the point when the interrupt signal is inputted is ended. Generally, in correlation computation processing, a plurality of correlation values between a signal sample and a replica code with a plurality of phases and a plurality of frequencies are calculated, and a result of correlation computation for a location information satellite, that is, a measurement, is acquired based on a phase and frequency achieving the highest correlation value of these correlation values. In this embodiment, when an interrupt signal is inputted during the execution of the correlation computation processing for a phase and frequency, the baseband control unit 126 controls the correlation computation unit 124 to interrupt the correlation computation processing after the currently executed correlation computation processing for the phase and frequency is completed.

In this case, in this embodiment, the time until the interrupt signal is inputted to the baseband control unit 126 after the power source voltage determination circuit 127 detects the voltage V is short, as described above. Also, the correlation computation processing by the correlation computation unit 124 ends in approximately 0.1 msec. Therefore, during the period until the correlation computation processing is interrupted in step S10 after the determination in step S5 results in No, the system of the electronic timepiece 1 can be restrained from going down due to a drop in the voltage V of the secondary battery 24 to the system halt voltage. Also, the capture processing can be interrupted according to the power source voltage, even before the final result of correlation computation for one location information satellite 100 is obtained, that is, even during the capture processing for one location information satellite 100.

In step S10, the baseband control unit 126 controls the power source power supply unit 13 to stop supplying electric power to the correlation computation unit 124 and thus interrupts the correlation computation processing by the correlation computation unit 124.

Then, in step S11, the baseband control unit 126 causes the correlation computation result storage unit 125 to store the result of the correlation computation processing computed at the point when the interrupt signal is inputted.

During the interruption of the correlation computation processing, the power source voltage determination circuit 127 in step S12 detects the voltage V of the secondary battery 24.

Then, in step S13, the power source voltage determination circuit 127 determines whether the voltage V of the secondary battery 24 is higher than a preset threshold V2 or not. In this embodiment, a value higher than the threshold V1 is set as the threshold V2. For example, a value of approximately 2.6 V is set. However, the threshold V2 may be set to the same value as the threshold V1. The threshold V2 is an example of the second threshold according to the present disclosure.

When the result of the determination in step S13 is No, the processing returns to step S12 and the same processing is repeated.

When the result of the determination in step S13 is Yes, the power source voltage determination circuit 127 stops outputting the interrupt signal. Thus, the baseband control unit 126 executes the processing of step S8 onward. That is, when the voltage V of the secondary battery 24 exceeds the threshold V2 and the input of the interrupt signal is stopped, the baseband control unit 126 controls the correlation computation unit 124 to resume the correlation computation processing. Specifically, when the input of the interrupt signal is stopped, the baseband control unit 126 controls the power source power supply unit 13 to resume the supply of electric power to the correlation computation unit 124. Thus, the correlation computation processing is resumed from the location information satellite 100 subsequent to the location information satellite 100 for which the correlation is computed at the point when the interrupt signal is inputted.

In other words, the correlation computation processing subsequent to the correlation computation processing with the replica code, phase, and frequency at the point when the interrupt signal is inputted, that is, the correlation computation processing where at least one of the replica code, phase, and frequency is different from that at the point of interruption, is started.

Also, storing the result of correlation computation from which the Doppler effect is eliminated enables resumption of the computation of the correlation value between the signal sample and the replica code.

Advantageous Effects of First Embodiment

This embodiment can achieve the following effects.

In this embodiment, the electronic timepiece 1 has the baseband control unit 126 controlling the correlation computation unit 124 to interrupt correlation computation processing when the power source voltage determination circuit 127 determines that the voltage V is lower than the threshold V1 and to resume the correlation computation processing when the power source voltage determination circuit 127 determines that the voltage V exceeds the threshold V2.

Thus, the baseband control unit 126 controls the correlation computation unit 124 to interrupt and resume the correlation computation processing according to the remaining capacity of the secondary battery 24. This can restrain the system of the electronic timepiece 1 from going down during satellite capture control processing.

In this embodiment, when an interrupt signal is inputted to the baseband control unit 126, the baseband control unit 126 controls the correlation computation unit 124 to interrupt the correlation computation processing at the point when the computation of the correlation value between the replica code and the signal sample that is computed at the point when the interrupt signal is inputted is ended, and the baseband control unit 126 causes the correlation computation result storage unit 125 to store the result of correlation computation. When the input of the interrupt signal is stopped, the baseband control unit 126 controls the correlation computation unit 124 to resume the correlation computation processing, based on the result of correlation computation stored in the correlation computation result storage unit 125.

Thus, the baseband control unit 126 causes the correlation computation result storage unit 125 to store the result of the correlation computation processing computed at the point when the interrupt signal is inputted during the correlation computation processing. When the input of the interrupt signal is stopped, that is, when the voltage V of the secondary battery 24 reaches the threshold V2, the baseband control unit 126 controls the correlation computation unit 124 to resume the correlation computation processing. Therefore, the correlation computation unit 124 can sequentially compute the correlation value of a plurality of replica codes corresponding to the location information satellite 100, even when the voltage V of the secondary battery 24 becomes lower than the threshold V1 during the correlation computation processing.

In this embodiment, when the power source voltage determination circuit 127 determines that the voltage V is lower than the threshold V1, the baseband control unit 126 controls the power source power supply unit 13 to stop supplying electric power to the correlation computation unit 124 and thus interrupts the correlation computation processing. When the power source voltage determination circuit 127 determines that the voltage V exceeds the threshold V2, the baseband control unit 126 controls the power source power supply unit 13 to resume the supply of electric power to the correlation computation unit 124 and thus resumes the correlation computation processing.

Thus, the time until the baseband control unit 126 interrupts the correlation computation processing after the power source voltage determination circuit 127 detects that the voltage V is lower than the threshold V1 is short. This can restrain the system of the electronic timepiece 1 from going down due to a voltage drop in the secondary battery 24.

Second Embodiment

Next, a second embodiment will be described with reference to FIG. 6.

The second embodiment is different from the first embodiment in that the baseband control unit 126 decides the number of correlators 1241 used, according to the voltage V inputted to the power source voltage determination circuit 127, that is, according to the voltage V of the secondary battery 24.

The structure of the electronic timepiece 1 in the second embodiment is similar to that in the first embodiment. Therefore, the detailed description of the structure is omitted or simplified.

Figure 6:
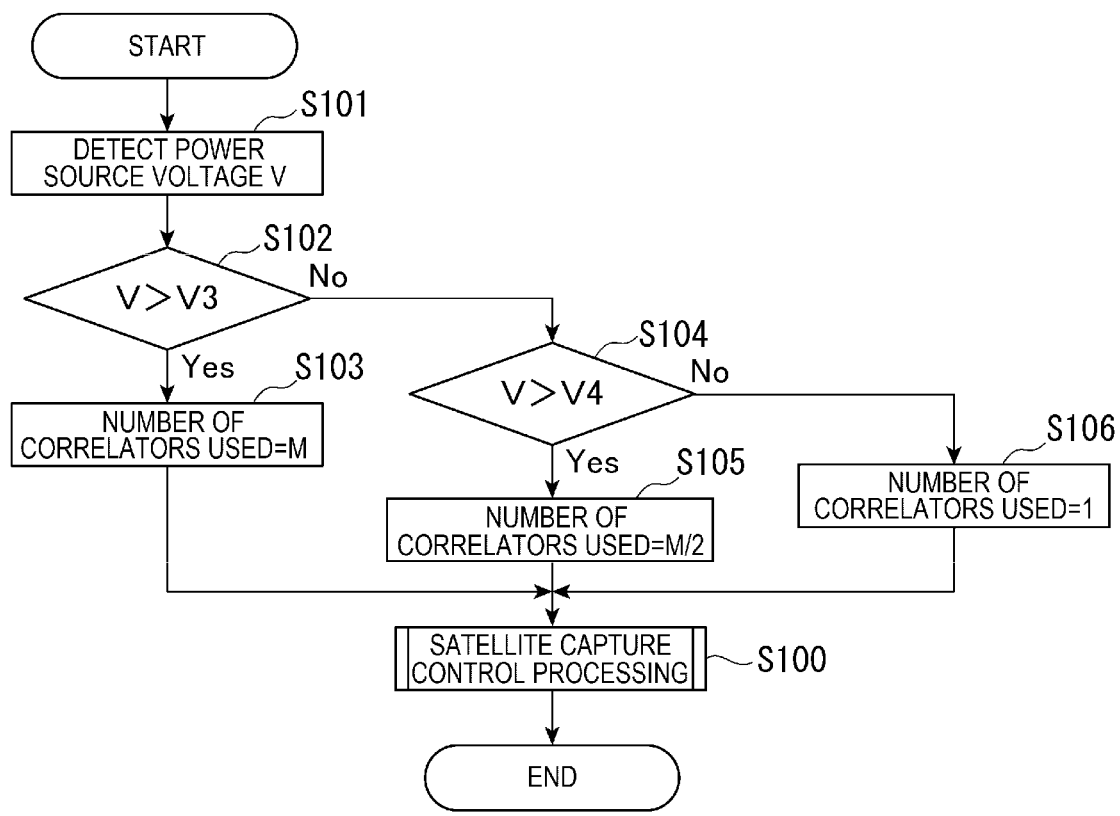
FIG. 6 is a flowchart showing satellite capture control processing in a second embodiment.

FIG. 6 is a flowchart showing satellite capture control processing in the second embodiment.

As shown in FIG. 6, in this embodiment, the power source voltage determination circuit 127 detects the voltage V of the secondary battery 24 in step S101.

Next, in step S102, the power source voltage determination circuit 127 determines whether the voltage V of the secondary battery 24 is higher than a preset threshold V3 or not. As the threshold V3, a value close to the nominal voltage of 3.7 V of the secondary battery 24 is set. For example, a value of approximately 3.6 V is set.

When the result of the determination in step S102 is Yes, the baseband control unit 126 in step S103 has a signal based on the result of the determination inputted from the power source voltage determination circuit 127 and sets the number of correlators 1241 used in the correlation computation unit 124 to "M". That is, when the voltage V of the secondary battery 24 is higher than V3, the baseband control unit 126 sets all the correlators 1241 to be used in the correlation computation unit 124.

Then, in step S100, the baseband control unit 126 executes the satellite capture control processing in the first embodiment.

Back to step S102, when the result of the determination in step S102 is No, the power source voltage determination circuit 127 in step S104 determines whether the voltage V of the secondary battery 24 is higher than a preset threshold V4 or not. As the threshold V4, a lower value than the threshold V3, for example, a value of approximately 3.0 V, is set.

When the result of the determination in step S104 is Yes, the baseband control unit 126 in step S105 has a signal based on the result of the determination inputted from the power source voltage determination circuit 127 and sets the number of correlators 1241 used in the correlation computation unit 124 to "M/2". That is, when the voltage V of the secondary battery 24 is equal to or lower than V3 and higher than V4, the baseband control unit 126 sets a half of the correlators 1241 to be used in the correlation computation unit 124.

In step S105, the baseband control unit 126 is not limited to setting the "M/2" correlators 1241 to be used. For example, the baseband control unit 126 may be configured to set "M/3" correlators 1241 to be used, or may be configured to set an arbitrary number of correlators 1241 to be used.

Then, in step S100, the baseband control unit 126 executes the satellite capture control processing in the first embodiment.

Back to step S104, when the result of the determination in step S104 is No, the baseband control unit 126 in step S106 has a signal based on the result of the determination inputted from the power source voltage determination circuit 127 and sets the number of correlators 1241 used in the correlation computation unit 124 to "1". Then, in step S100, the baseband control unit 126 executes the satellite capture control processing in the first embodiment. That is, in the second embodiment, when the voltage V of the secondary battery 24 is low, the satellite capture control processing is executed, reducing the number of correlators 1241 used.

Advantageous Effects of Second Embodiment

This embodiment can achieve the following effects.

In this embodiment, the baseband control unit 126 decides the number of correlators 1241 used, according to the voltage V of the secondary battery 24.

Thus, when the voltage V of the secondary battery 24 is high, increasing the number of correlators 1241 used can reduce the time for correlation computation processing. When the voltage V of the secondary battery 24 is low, reducing the number of correlators 1241 used can restrain the system of the electronic timepiece 1 from going down.

Modification Examples

The present disclosure is not limited to the above embodiments and includes modifications, improvements and the like within a range that can achieve the object of the present disclosure.

In the embodiment, when the interrupt signal is inputted to the baseband control unit 126, the baseband control unit 126 controls the correlation computation unit 124 to interrupt the correlation computation processing at the point when the computation of the correlation value between the replica code and the signal sample that is computed at the point when the interrupt signal is inputted is ended. However, this is not limiting. For example, the baseband control unit 126 may control the correlation computation unit 124 to interrupt the correlation computation processing at the point when the interrupt signal is inputted. In this case, the baseband control unit 126 may be configured to cause the correlation computation result storage unit 125 to store the result of correlation computation up to the point when the interrupt signal is inputted. This enables the correlation computation unit 124 to resume the computation of the correlation value between the replica code and the signal sample from the point of interruption, when the input of the interrupt signal is stopped.

In the above embodiments, the baseband control unit 126 stops supplying electric power to the correlation computation unit 124 to interrupt the correlation computation processing and resumes the supply of electric power to the correlation computation unit 124 to resume the correlation computation processing. However, this is not limiting. For example, the correlation computation unit 124 may be configured to interrupt and resume the correlation computation processing in the state of being supplied with electric power.

In the first embodiment, the correlation computation unit 124 has a plurality of correlators 1241. However, this is not limiting. The present disclosure includes, for example, the case where the correlation computation unit 124 has only one correlator 1241.

In the second embodiment, the baseband control unit 126 decides the number of correlators 1241 used, according to the voltage V of the secondary battery 24, before executing the satellite capture control processing. However, this is not limiting. For example, the baseband control unit 126 may be configured to change the number of correlators 1241 used, according to the voltage V of the secondary battery 24, while executing the satellite capture control processing.

In the second embodiment, the baseband control unit 126 decides the number of correlators 1241 used, from among three stages, according to the voltage V of the secondary battery 24. However, this is not limiting. For example, the baseband control unit 126 may decide the number of correlators 1241 used, between two stages or from among four or more stages, according to the voltage V of the secondary battery 24.

In the second embodiment, the baseband control unit 126 executes the satellite capture control processing according to the present disclosure, that is, the satellite capture control processing in which the correlation computation processing is interrupted and resumed according to the voltage V of the secondary battery 24, regardless of the number of correlators 1241 used. However, this is not limiting. For example, the baseband control unit 126 may be configured to execute the satellite capture control processing according to the present disclosure only when the number of correlators 1241 used is small, that is, only when the voltage V of the secondary battery 24 is low, and to execute known satellite capture processing when the number of correlators 1241 used is large.

In the second embodiment, the baseband control unit 126 may be configured to set the threshold V2 according to the number of correlators 1241 used. That is, the baseband control unit 126 may be configured to set the threshold V2 to a high value when the number of correlators 1241 used is large, and to set the threshold V2 to a low value when the number of correlators 1241 used is small. This can securely restrain the system of the electronic timepiece 1 from going down even when the number of correlators 1241 used is large.

In the embodiments, the control device 40 has the time measuring unit 410 and the positioning unit 420. However, this is not limiting. For example, the satellite signal receiving device 10 may have a time measuring unit and a positioning unit, and the control device 40 may be configured to acquire time information and location information from the satellite signal receiving device 10. Such a configuration enables the satellite signal receiving device 10 to implement positioning processing and time measuring processing without actuating the control device 40 and therefore achieves lower power consumption by the electronic timepiece 1.

In the embodiments, the charger circuit 25 supplies the electric power generated by the solar battery 26 to the secondary battery 24 and thus charges the secondary battery 24. However, this is not limiting. For example, self-winding power generation using a rotor, dynamic power generation using a piezoelectric element, thermodynamic power generation utilizing the difference between body temperature and ambient temperature, electromagnetic power generation using electromagnetic waves, and a combination of these may be employed.

In the embodiment, the power source voltage determination circuit 127 outputs an interrupt signal to the baseband control unit 126, and the baseband control unit 126 controls the correlation computation unit 124 to interrupt and resume the correlation computation processing, based on the inputted interrupt signal. However, this is not limiting. For example, the power source voltage determination circuit 127 may be configured to output an interrupt signal to the correlation computation unit 124, and the correlation computation unit 124 may be configured to interrupt and resume the correlation computation processing, based on the inputted interrupt signal. That is, the power source voltage determination circuit 127 may form the power source voltage determination unit and the correlation computation control unit according to the present disclosure.

What is claimed is:

1. An electronic timepiece comprising:
    a power source;
    a receiving unit configured to receive at least one of satellite signals transmitted from a plurality of satellites, converting the satellite signal into a digital signal, and outputting the digital signal;
    a baseband unit configured to
        store the digital signal as a signal sample,
        using a plurality of correlators, execute correlation computation processing of sequentially computing a correlation value between the signal sample and a plurality of codes corresponding to the plurality of satellites, and
        store a result of correlation computation by the plurality of correlators; and
    a power supply configured to supply electric power from the power source to the receiving unit and the baseband unit,
    wherein the baseband unit is further configured to
        using a power source voltage determination circuit, (i) detect a first voltage of the power source prior to starting the correlation computation processing, (ii) determine whether the detected first voltage is lower than a first threshold, (iii) detect a second voltage of the power source during the correlation computation processing, (iv) determine whether the detected second voltage exceeds a second threshold set to be equal to or higher than the first threshold, (v) detect a third voltage of the power source subsequent to interrupting the correlation computation processing, and (vi) determine whether the detected third voltage exceeds a third threshold set to be equal to or higher than the second threshold, and
        using a baseband control unit, control the plurality of correlators to interrupt the correlation computation processing when the power source voltage determination circuit determines that the second voltage is lower than the second threshold, and to resume the correlation computation processing when the power source voltage determination circuit determines that the third voltage exceeds the third threshold.

2. The electronic timepiece according to claim 1, wherein the power source voltage determination circuit outputs an interrupt signal to interrupt the correlation computation processing to the baseband control unit when determining that the first voltage is lower than the first threshold, and stops outputting the interrupt signal when determining that the second voltage exceeds the second threshold, and the baseband control unit, when the interrupt signal is inputted thereto, controls the plurality of correlators to interrupt the correlation computation processing and causes the baseband unit to store the result of correlation computation, at a point when computation of a correlation value between a code and the signal sample computed at a point when the interrupt signal is inputted is ended, and when the input of the interrupt signal is stopped, controls the plurality of correlators to resume the correlation computation processing, based on the result of correlation computation stored in the baseband unit.

3. The electronic timepiece according to claim 1, wherein baseband control unit controls the power supply to stop the supply of electric power to the plurality of correlators and thus interrupts the correlation computation processing, when the power source voltage determination circuit determines that the first voltage is lower than the first threshold, and controls the power supply to resume the supply of electric power to the plurality of correlators and thus resumes the correlation computation processing, when the power source voltage determination circuit determines that the second voltage exceeds the second threshold.

4. The electronic timepiece according to claim 1, wherein the baseband control unit decides a number of the correlators used, according to the first voltage.

5. A satellite signal receiving device comprising:

a receiving unit receiving at least one of satellite signals transmitted from a plurality of satellites, converting the satellite signal into a digital signal, and outputting the digital signal;

a baseband unit configured to store the digital signal as a signal sample, using a plurality of correlators, execute correlation computation processing of sequentially computing a correlation value between the signal sample and a plurality of codes corresponding to the plurality of satellites, and store a result of correlation computation by plurality of correlators; and a power supply supplying electric power from a power source to the receiving unit and the baseband unit;

wherein the baseband unit is further configured to using a power source voltage determination circuit, (i) detect a first voltage of the power source prior to starting the correlation computation processing, (ii) determine whether the detected first voltage is lower than a first threshold, (iii) detect a second voltage of the power source during the correlation computation processing, (iv) determine whether the detected second voltage exceeds a second threshold set to be equal to or higher than the first threshold, (v) detect a third voltage of the power source subsequent to interrupting the correlation computation processing, and (vi) determine whether the detected third voltage exceeds a third threshold set to be equal to or higher than the second threshold, and using a baseband control unit, control the plurality of correlators to interrupt the correlation computation processing when the power source voltage determination circuit determines that the second voltage is lower than the second threshold, and to resume the correlation computation processing when the power source voltage determination circuit determines that the third voltage exceeds the third threshold.

6. The satellite signal receiving device according to claim 5, wherein the power source voltage determination circuit outputs an interrupt signal to interrupt the correlation computation processing to the baseband control unit when determining that the first voltage is lower than the first threshold, and stops outputting the interrupt signal when determining that the second voltage exceeds the second threshold, and the baseband control unit when the interrupt signal is inputted thereto, controls the plurality of correlators to interrupt the correlation computation processing and causes the baseband unit to store the result of correlation computation, at a point when computation of a correlation value between a code and the signal sample computed at a point when the interrupt signal is inputted is ended, and when the input of the interrupt signal is stopped, controls the plurality of correlators to resume the correlation computation processing, based on the result of correlation computation stored in the baseband unit.

7. A method for controlling a satellite signal receiving device, the device including: a receiving unit receiving at least one of satellite signals transmitted from a plurality of satellites, converting the satellite signal into a digital signal, and outputting the digital signal; a baseband unit storing the digital signal as a signal sample, executing correlation computation processing of sequentially computing a correlation value between the signal sample and a plurality of codes corresponding to the plurality of satellites using a plurality of correlators, and storing a result of correlation computation by the plurality of correlators; a power supply supplying electric power from a power source to the receiving unit and the baseband unit; and a power source voltage determination circuit configured to (i) detect a first voltage of the power source prior to starting the correlation computation processing, (ii) determine whether the detected first voltage is lower than a first threshold, (iii) detect a second voltage of the power source during the correlation computation processing, (iv) determine whether the detected second voltage exceeds a second threshold set to be equal to or higher than the first threshold, (v) detect a third voltage of the power source subsequent to interrupting the correlation computation processing, and (vi) determine whether the detected third voltage exceeds a third threshold set to be equal to or higher than the second threshold, the method comprising:

interrupting the correlation computation processing by the plurality of correlators when the power source voltage determination circuit determines that the second voltage is lower than the second threshold; and resuming the correlation computation processing by the plurality of correlators when the power source voltage determination circuit determines that the third voltage exceeds the third threshold.

8. The method for controlling the satellite signal receiving device according to claim 7, further comprising:

outputting an interrupt signal to interrupt the correlation computation processing when the power source voltage determination circuit determines that the first voltage is lower than the first threshold;

when the interrupt signal is inputted thereto, controlling the plurality of correlators to interrupt the correlation computation processing and causing the baseband unit to store the result of correlation computation, at a point when computation of a correlation value between a code and the signal sample computed at a point when the interrupt signal is inputted is ended;

stopping outputting the interrupt signal when the power source voltage determination circuit determines that the second voltage exceeds the second threshold; and when the input of the interrupt signal is stopped, controlling the plurality of correlators to resume the correlation computation processing, based on the result of correlation computation stored in the baseband unit.

\* \* \* \* \*